United States Patent Office 3,383,440
Patented May 14, 1968

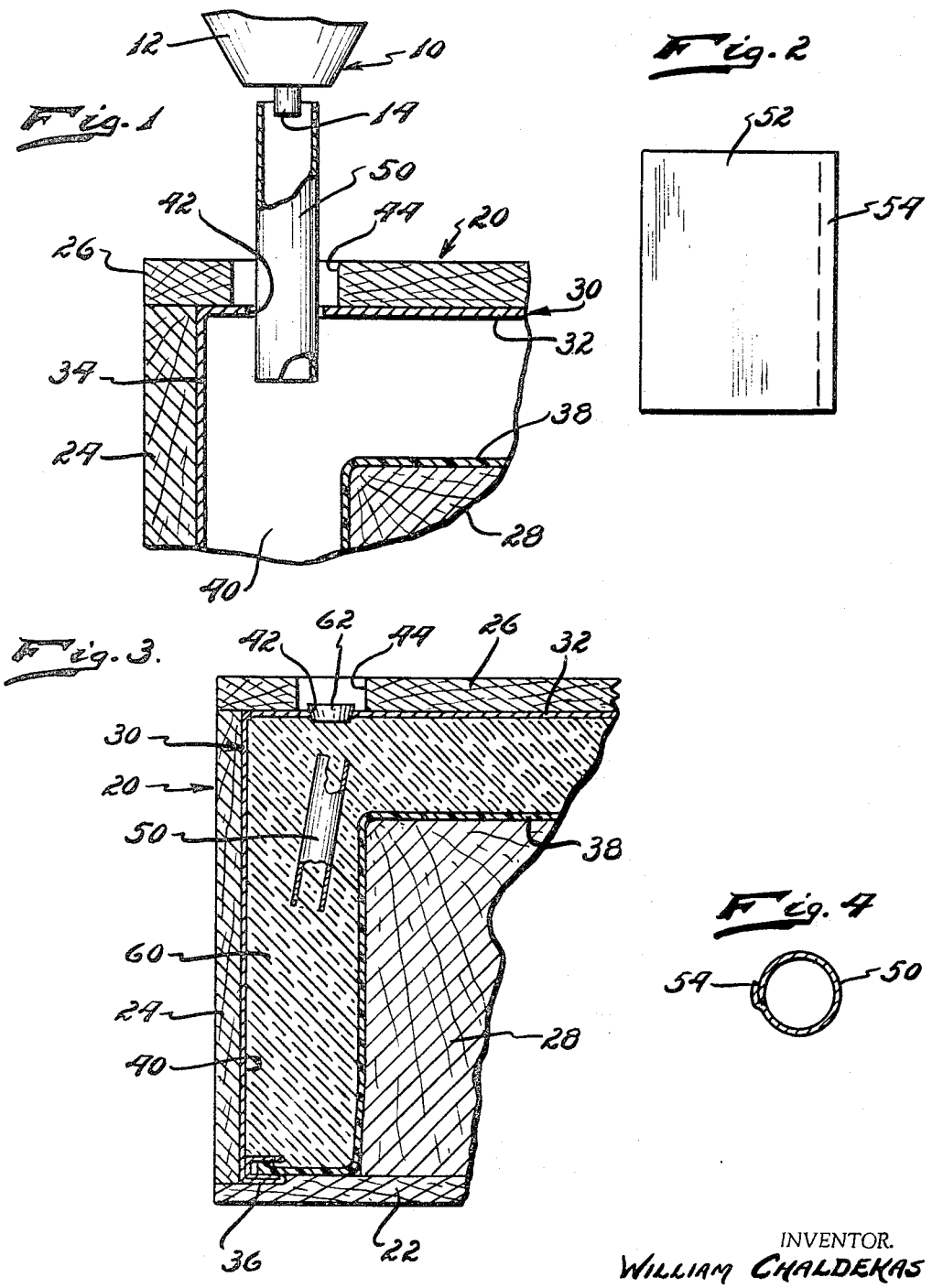

3,383,440
FOAM POUR METHOD
William Chaldekas, Livonia, Mich., assignor to American Motors Corporation, Detroit, Mich., a corporation of Maryland
Filed Apr. 14, 1965, Ser. No. 448,142
1 Claim. (Cl. 264—45)

ABSTRACT OF THE DISCLOSURE

A method of interconnecting to conduct from a supply source liquid foam insulation into a wall space of a cabinet and disposing of the interconnection following use by dropping same into the wall space.

---

This invention relates to a method of pouring foam insulation in a cabinet wall space.

Polyurethane plastic foam is being used more and more as an insulating and filler material in cabinet construction and particularly for refrigerator cabinets. The polyurethane resin material is initially in a liquid state and capable of being poured from a regular flow nozzle type outlet. It passes from liquid to a soft gel state and then sets up in a solid form within a cabinet wall space in which it is introduced.

Because of the expansive force of the foam material, it is important to control the amount of material that is introduced into a cabinet wall space. This also means that the physical aspects of pouring the liquid material into a given space are due serious consideration.

At present, metal, plastic or other hoses, tubes or funnels are used to convey liquid foam material from its outlet source through a pour hole in a receptive cabinet or other wall space. The nozzle device and valve means for controlling the pour is usually swung over the structure to receive the foam material, the funnel or whatever is introduced into the pour hole and held under the flow nozzle, and the pour is made.

In many instances, where the amount of foam material used is particularly important, a new or clean funnel, or like device, is used for each pour. This assures exactly the same pour each time; except for spillage and unavoidable variance in the amount of material which wets the funnel each time.

The present invention is very simple and effective for its intended purpose. Its object is to provide a more accurate method of pouring foam material as well as a simpler procedure for doing so. This it accomplishes more effectively and with notable cost savings besides.

In particular, the present invention proposes the use of a straight tube made of paper or similar low cost material and which is not only disposable but which may be dropped through the pour hole with which used, to carry with it any foam material wetting the inner surface thereof.

Referring to the accompanying drawing:

FIG. 1 is a side elevation, with parts cut away and cross-sectioned, to show the general foam pouring operation.

FIG. 2 shows the blank form of the disposable pour hole tube proposed.

FIG. 3 shows part of a cabinet structure, in a mold form, in cross-section, with a pour hole tube disposed therein.

FIG. 4 is a cross-sectional end view of the proposed pour hole tube.

In the manufacture of regrigerator cabinets, with foam insulation, cabinet shells move along a production line to receive liners and other component parts and to be disposed in a mold form and received at a station where the foam pouring operation occurs.

The liquid foam pouring apparatus 10 includes a head 12 which may be swung out over the production line and which includes a flow nozzle 14 through which the polyurethane resin foam material is discharged.

The foam discharge nozzle 14 is disposed a distance over the production line and particularly over the mold form 20 within which is provided the refrigerator cabinet intended to receive the insulation filler material.

The mold form 20, includes bottom, side and top walls 22, 24 and 26, respectively, and core members 28 receptive within the chamber spaces of the refrigerator cabinet.

The refrigerator cabinet 30 shown includes an outer shell which is formed by back, side and end walls, and an in-turned flange at the front edge, identified as 32, 34 and 36 respectively, with a liner 38 disposed therein and in spaced relation to the outer cabinet walls. This provides the enclosed wall space 40 within which the foam insulation material is to be provided.

A pour hole 42 is formed in the back wall 32 of the cabinet shown for access to the enclosed space 42 and, immediately over it is a larger opening 44 through the mold form 20.

In the practice of the present invention a paper tube 50, cylindrical and open at both ends, is inserted in the pour hole 42 and received over the end of the flow nozzle 14.

The paper tube member 50 is formed from a rectangular blank 52, as shown by FIG. 2, rolled and joined together along opposite side edges, as at 54. The paper used has reasonable stiffness and wet strength for its intended purpose so that it will not collapse in use or otherwise. It is circular in cross section, as shown by the last drawing figure, and of a uniform cross-section throughout its length.

The paper tube 50 serves as a funnel and is of a size permitting it to be received over the flow nozzle 14 and easily through the pour hole 42 to minimize any overflow or spillage. Its length is enough to extend through the pour hole for some slight distance when engaged over the flow nozzle 14 so that it can also accommodate any reasonable mis-alignment of the flow nozzle relative to the pour hole.

After the pour, the paper tube 50 is dropped through the pour hole 42 and into the enclosed space 40. As the foam material, identified by the numeral 60, sets up and rises, it carries the paper tube with it and causes it to be embedded therewithin as shown.

The pour hole is closed as by a cork 62, assuming other provision made for an air bleed, and the foam pour operation is completed.

I claim:
1. The method of pour foam insulation in a liqiud state into a space between walls of a cabinet, and comprising;
providing straight walled flow passage means between a liquid foam source and a receptive pour hole provided in said cabinet for access into said space,
holding one end of the flow passage means over and in communication with the liquid foam source and the other end thereof being inserted through said pour hole and pouring the liquid through said flow passage means while held in this state, and dropping said flow passage means through said pour hole into said space following completion of the pouring of the liquid therethrough and in the disposal thereof.

References Cited

UNITED STATES PATENTS

| | | | |
|---|---|---|---|
| 2,553,757 | 5/1951 | Evans | 99—138.5 |
| 2,849,321 | 8/1958 | Lhermitte et al. | |
| 3,132,382 | 5/1964 | Magester | 264—45 XR |

OTHER REFERENCES

Ritchie, W. E., "Fibre Cans and Tubes," in Packaging Catalog, 1932, pp. 51–52, copy in Scientific Library.

ALEXANDER H. BRODMERKEL, *Primary Examiner.*

DONALD J. ARNOLD, *Examiner.*

P. E. ANDERSON, *Assistant Examiner.*